Nov. 8, 1949    S. WEISS    2,487,084
FASTENER
Filed May 2, 1945
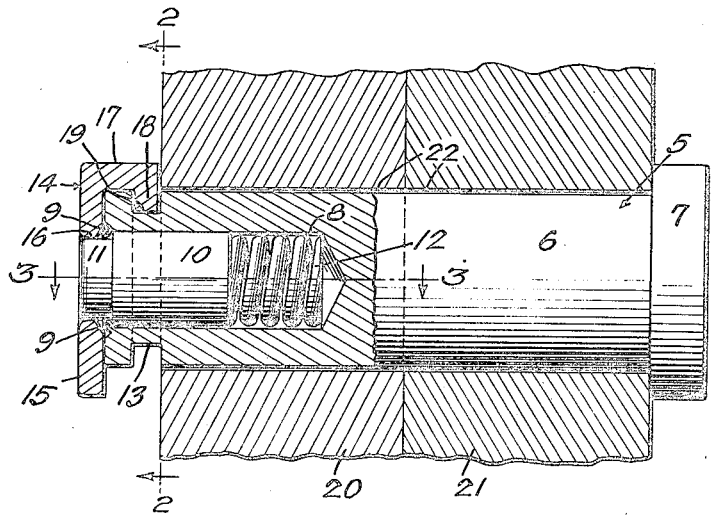
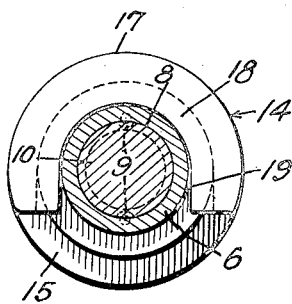
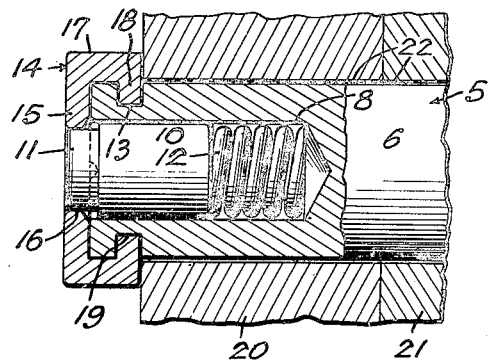
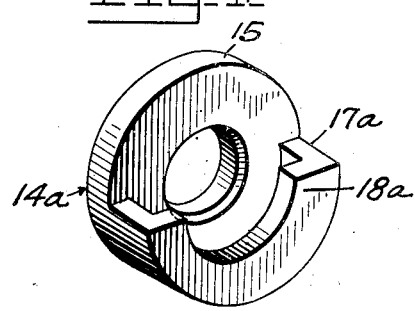
Inventor
SAUL WEISS,
By C. E. Herrstrom & M. E. Thibodeau
Attorneys Patented Nov. 8, 1949

2,487,084

UNITED STATES PATENT OFFICE 2,487,084

FASTENER

Saul Weiss, Washington, D. C.

Application May 2, 1945, Serial No. 591,596

4 Claims. (Cl. 85—7)

(Granted under the act of March 3, 1883, as amended April 30, 1928; 370 O. G. 757)

The invention described herein may be manufactured and used by or for the Government for governmental purposes without the payment to me of any royalty thereon.

This invention relates to an improved quickly detachable fastener for use in lieu of a nut and bolt or other similar fastener for connecting a plurality of elements.

A special object of the invention is to provide a fastener capable of being quickly detached without the use of any special tool.

Another object of the invention is to provide a fastener which will not become accidentally disengaged by being subjected to vibration or other movement.

Other objects and advantages of the invention will hereinafter become more fully apparent from the following description of the drawing, which illustrates preferred embodiments thereof, and wherein;

Figure 1 is a side elevation view partly in longitudinal section showing the fastener assembled and applied;

Figure 2 is a cross sectional view of the fastener taken substantially along a plane as indicated by the line 2—2 of Figure 1;

Figure 3 is a longitudinal sectional view partly in elevation of a portion of the fastener; and Figure 4 is a perspective view of a slightly modified form of one element of the fastener.

Referring more particularly to the drawing, wherein like reference characters designate like or corresponding parts throughout the several views, 5 designates generally the improved fastener in its entirety and which includes a pin or bolt 6 having a head 7 at one end thereof. The pin 6 is provided with a longitudinal bore 8 which opens outwardly of its opposite, shank end. The shank end of the pin 6 is provided with integral inwardly flared lips 9 which restrict the open end of the bore 8.

A plunger 10 is slidably disposed in the bore 8 and is provided with a restricted outer end 11 sized to slidably pass through the restricted mouth of the bore 8. The body portion of the plunger 10 is of sufficient size to be restricted from passage through the restricted mouth of the bore 8 to limit the outward movement thereof to a position as seen in Figures 1 and 3. An expansion spring 12 is mounted between the inner end of the bore 8 and the plunger 10 for biasing the plunger outwardly. The spring 8 and plunger 10 are assembled in the bore 8 by being placed therein before the lips 9 are formed to restrict the mouth of the bore 8.

The pin 6, adjacent its shank end, is provided with an annular outwardly opening groove or channel 13. A retaining member, designated generally 14, includes a disk or plate portion 15 which is adapted to bear against the shank end of the pin 6 and which is provided with an opening 16 to receive the restricted plunger end 11. The retaining member 14 is provided with an arcuately shaped portion 17 which is formed integral with the disk 15 and which is disposed at substantially a right angle thereto and extends from a portion of the outer edge thereof. The portion 17 carries an integral inturned flange 18 having a recess 19 which opens outwardly of one end thereof and which includes an arcuately shaped intermediate portion and substantially parallel end portions, as seen in Figure 2, the space between which is slightly greater than the diameter of the pin 6 as measured across its groove 13.

From the foregoing it will be readily apparent that the retaining member 14 can be applied to the shank end of the pin 6, when the plunger 10 is retracted into the bore 8, by diametric or lateral movement relatively thereto to engage the inturned flange 18 with the groove 13, the lateral portion 17 with a part of the periphery of the pin 6, and the disk 15 with the shank end of the pin 6. The plunger 10 is then released and projected outwardly of the bore 8 by the spring 12 to cause the plunger portion 11 to engage the opening 16 to retain the element 14 against diametric or lateral movement relatively to the pin 6. Thus, the groove 13 and the inturned portion 18 prevent longitudinal displacement of the retaining element 14 and the plunger portion 11 prevents lateral or diametrical displacement thereof to effectively retain the element 14 on the pin 6. Obviously, the element 14 can be readily removed by forcing the plunger 10 inwardly of the bore 8 against the spring 12 to release element 14 to permit it to be removed laterally or diametrically from the pin 6.

As seen in Figure 2, the portion 17 and the inturned portion 18 extend around a part of the disk 15 greater than a half thereof, so that the portion 18 is of substantially yoke shaped construction. If desired, and as illustrated in Figure 4, the retaining member could be modified by providing a portion 17a in lieu of the portion 17 and which is substantially semicircular, and a portion 18a, in lieu of the portion 18 and which is likewise semicircular, to thus form a slightly modified retaining element, designated generally 14a. In the retaining element 14a the disk portion 15 thereof is not modified.

In the Figures 1 and 3 two members 20 and 21, provided with aligned openings 22, are connected by the fastener 5. The shank portion of the pin 6 extends through the aligned openings 22 and the head 7 bears against the exposed face of the member 21. The free edge of the portion 17 bears against the exposed face of the element 20 to thereby cooperate with the head 7 for effectively securing the members 20 and 21 together and on the shank of the pin 6.

Various other modifications and changes are contemplated and may obviously be resorted to without departing from the spirit and scope of the invention as hereinafter defined by the appended claims, as only preferred embodiments of the fastener have been disclosed.

I claim:

1. In a fastener, a pin having a central axial bore opening through one end thereof, a plunger slidable in said bore, spring means urging said plunger axially outwardly in said bore, means limiting said plunger in outward movement so that only a portion thereof projects from said bore, there being a circumferential channel in said pin adjacent said one end, a disk having a central opening to receive said plunger and a laterally and inwardly turned semi-circular flange adapted to be seated in said channel only by a movement radially of said pin when said plunger is forced within said bore, said plunger when released entering said central opening to thereby lock said disk in position on said pin.

2. A fastener comprising a headed pin having a circumferential channel adjacent the end remote from the head thereof, retractable means projecting coaxially from said end, and a retaining element having a central hole and a semi-circular, laterally and inwardly turned flange concentric of said hole, said flange being adapted to engage in said channel by movement in a radial direction only relatively to said pin when said retractable means is within said pin, and means urging said retractable means outwardly, said retractable means engaging the hole of said retaining element to lock said element in position on said pin.

3. A fastener comprising a pin having a central bore opening through one end thereof and a circumferentially-extending channel adjacent said one end, a plunger slidable in said bore and having a reduced outer end, means yieldingly urging said plunger to movement outwardly of said bore, means limiting said movement from a first position in which said plunger is confined within said bore, to a second position in which said reduced end only projects from said bore, a disk having a central aperture, and a semi-circular inwardly-extending flange concentric of said aperture and adapted to be moved radially to seat in said channel when said plunger is in first position; said plunger when in second position having its reduced end fitting said aperture to thereby lock said disk on said pin.

4. In a fastener, a pin having a central bore opening through one end and a channel extending circumferentially closely adjacent but spaced from said one end, a disk having a central hole and a semi-circular radially inturned flange adapted to seat in said channel when said disk is slid radially across said one end of said pin, a plunger slidably fitting said bore and having an end adapted to fit said hole when said flange is seated in said channel, and means urging said plunger axially outwardly of said bore to thereby lock said pin and disk together when the latter is seated as aforesaid.

SAUL WEISS.

REFERENCES CITED

The following references are of record in the file of this patent:

FOREIGN PATENTS

| Number | Country | Date |
|--------|---------|------|
| 44,597 | Holland | Dec. 15, 1938 |
| 731,400 | France | Sept. 2, 1932 |